(12) United States Patent
Martin et al.

(10) Patent No.: US 10,968,706 B2
(45) Date of Patent: Apr. 6, 2021

(54) ASSEMBLY FOR PRODUCING A THREADED CONNECTION FOR DRILLING AND OPERATING HYDROCARBON WELLS, AND RESULTING THREADED CONNECTION

(71) Applicants: VALLOUREC OIL AND GAS FRANCE, Aulnoye-Aymeries (FR); NIPPON STEEL CORPORATION, Chiyoda-ku (JP)

(72) Inventors: Pierre Bernard Martin, Marly (FR); Sebastien Colin, Bantouzelle (FR); Xavier Mencaglia, Gommegnies (FR); Karine Ruffin, Aubry-du-Hainaut (FR)

(73) Assignees: VALLOUREC OIL AND GAS FRANCE, Aulnoye-Aymeries (FR); NIPPON STEEL CORPORATION, Chiyoda-ku (JP)

(*) Notice: Subject to any disclaimer, the term of this patent is extended or adjusted under 35 U.S.C. 154(b) by 518 days.

(21) Appl. No.: 14/890,364

(22) PCT Filed: May 21, 2014

(86) PCT No.: PCT/EP2014/060472
§ 371 (c)(1),
(2) Date: Nov. 10, 2015

(87) PCT Pub. No.: WO2014/187873
PCT Pub. Date: Nov. 27, 2014

(65) Prior Publication Data
US 2016/0115742 A1    Apr. 28, 2016

(30) Foreign Application Priority Data
May 23, 2013   (FR) ..................... 1354626

(51) Int. Cl.
*F16L 15/00*    (2006.01)
*E21B 17/042*    (2006.01)

(52) U.S. Cl.
CPC ........ *E21B 17/0423* (2013.01); *F16L 15/002* (2013.01)

(58) Field of Classification Search
CPC .......................... F16L 15/002; E21B 17/0423
See application file for complete search history.

(56) References Cited

U.S. PATENT DOCUMENTS 3,989,284 A * 11/1976 Blose .................... E21B 17/042
                                                    285/332.2
4,384,737 A    5/1983 Reusser
(Continued)

FOREIGN PATENT DOCUMENTS

CN          1357087 A       7/2002
CN        102251748 A      11/2011
(Continued)

OTHER PUBLICATIONS

International Search Report dated Dec. 5, 2014, in PCT/EP2014/060472 filed May 21, 2014.

*Primary Examiner* — Matthew Troutman
*Assistant Examiner* — James A Linford
(74) *Attorney, Agent, or Firm* — Oblon, McClelland, Maier & Neustadt, L.L.P.

(57) ABSTRACT

An assembly for producing a threaded connection includes first and second tubular components with an axis of revolution and each provided at one end with at least first, second, and third continuous threaded zones provided in succession on the same helix on the outer or inner peripheral surface of the component depending on whether the threaded end is male or female. The components are capable of cooperating together upon makeup. At least one of the first, second, or third threaded zones has a variable width (Continued)

thread profile and is self-locking. The ends respectively finish in a free terminal surface. Each of the ends is free of a specific abutment surface. At least one sealing surface is provided between each of the adjacent threaded zones in order to cooperate in a sealed interference fit with a sealing surface provided on the corresponding end when the connection is made up.

21 Claims, 5 Drawing Sheets

(56) References Cited

U.S. PATENT DOCUMENTS

| | | | |
|---|---|---|---|
| 4,570,982 A | 2/1986 | Blose et al. | |
| 4,629,224 A * | 12/1986 | Landriault | E21B 17/0423 285/334 |
| 5,154,452 A * | 10/1992 | Johnson | E21B 17/0423 285/148.19 |
| 5,462,315 A * | 10/1995 | Klementich | E21B 17/0423 285/24 |
| 6,893,057 B2 * | 5/2005 | Evans | E21B 17/0423 285/332.4 |
| 2004/0084901 A1 | 5/2004 | Church | |
| 2009/0005808 A1 | 1/2009 | Hess et al. | |
| 2009/0058085 A1 | 3/2009 | Breihan et al. | |
| 2012/0074690 A1 | 3/2012 | Mallis | |
| 2012/0074693 A1 | 3/2012 | Mallis et al. | |
| 2013/0219686 A1 | 8/2013 | Mallis et al. | |
| 2014/0084582 A1 * | 3/2014 | Elder | E21B 17/0423 285/334 |

FOREIGN PATENT DOCUMENTS

| | | |
|---|---|---|
| CN | 102421987 A | 4/2012 |
| JP | 2-80886 A | 3/1990 |
| JP | 2013-511671 A | 4/2013 |
| UA | 71040 U | 6/2012 |
| WO | WO 2013/038072 A1 | 3/2013 |

* cited by examiner

ASSEMBLY FOR PRODUCING A THREADED CONNECTION FOR DRILLING AND OPERATING HYDROCARBON WELLS, AND RESULTING THREADED CONNECTION

BACKGROUND

The present invention relates to threaded connections for drilling and/or operating hydrocarbon wells, and more precisely optimizing the overall performance of a connection in terms of efficiency and seal when the connection works under compression/tension.

The term "threaded connections" means any assembly constituted by elements which are substantially tubular in shape, metallic and capable of being connected together by makeup with a particular view to constituting either a stem for drilling a hydrocarbon well, or a riser for maintenance (also known as a work-over riser), or for operating such a well, such as a riser, or a casing or tubing string used in operating a well.

Each tubular element comprises an end portion provided with a male threaded zone or a female threaded zone for making up with a corresponding end portion of an analogous element. When assembled, the elements make up what is known as a connection.

Such tubular threaded components of a connection are assembled under pre-set loads in order to respond to the interference fit and sealing requirements imposed by the service conditions. Furthermore, it should be noted that the threaded tubular components may have to undergo several makeup-breakout cycles, in particular when in service.

The conditions under which such threaded tubular components are used gives rise to an extensive range of mechanical loads which act on sensitive portions of those components such as the threaded zones, abutment zones or the sealing surfaces.

For this reason, connection design specifications are complex, requiring taking a number of parameters into account simultaneously. Thus, it is recommended that the efficiency of the connection be preserved, as well as the thickness of the zone of the tubular components which bears the sealing surfaces, and that the risks of displacing the sealing contact points when the connection operates under compression/tension should be minimized.

One type of solution has been developed through connections of the VAM HTF© type, which use two threaded zones between which are a first sealing surface and a second sealing surface provided at the lip of the male end. That design means that good stability of the first seal located between the threaded zones can be obtained, however the second seal is located on a very thin lip which renders the function of that seal vulnerable. In addition, when the connection operates in compression/tension, the second seal is not stable because of the alternating loads. Finally, the presence of a seal in the lip of the male end reduces the efficiency of the female end.

Another type of solution was also developed in the document U.S. Pat. No. 4,570,982 A1. That type of connection has three staggered threaded portions, which means that the tapers of the three threaded zones are not coincident but are parallel. Between each of the threaded zones is a sealing surface and an abutment. However, positioning abutments adjacent to sealing surfaces weakens said surfaces because the abutments are zones which are under particular load when the amplitude of the loads is high. The threaded zones are not self-locking and exhibit gaps at the load flanks and/or the stabbing flanks. However, because of those gaps, the stability of the sealing surfaces is compromised when the connection operates in compression/tension.

One kind of solution was also developed with connections of the VAM Edge© type, which employ two self-locking threaded zones between which is a sealing surface. As was the case for the VAM HTF©, that design leads to good stability of the intermediate seal at the threaded zones, however the single sealing surface is insufficient in the case of a flush or semi-flush connection in order to resist both internal pressure and external pressure.

BRIEF SUMMARY

For this reason, the aim of the invention is to respond to the threefold aim consisting of preserving the efficiency of the connection, maximizing the thickness of the zone of the tubular components which bears the sealing surfaces, and avoiding risks of displacement of the sealed contact points when the connection operates in compression/tension.

More precisely, the invention concerns an assembly for producing a threaded connection, comprising a first and a second tubular component with the same axis of revolution and each respectively provided at one of their ends with at least a first, a second, and a third continuous threaded zone provided in succession on the same helix on the outer or inner peripheral surface of the component depending on whether the threaded end is male or female in type, and being capable of cooperating together upon makeup, at least one of the first or second or third threaded zones having a variable width thread profile, and being self-locking, said ends respectively finishing in a free terminal surface, each of the ends being free of a specific abutment surface, at least one sealing surface being provided between each of the adjacent threaded zones in order to cooperate in a sealed interference fit with a sealing surface provided on the corresponding end when the connection is in the made up state.

Optional complementary or substitutional features of the invention are set out below.

The first, second and third continuous threaded zones of each end may extend in the same taper generatrix.

The at least one sealing surface provided between each of the adjacent threaded zones cooperating mutually in a sealed interference fit form a torus-on-cone contact.

One of the sealing surfaces may be a domed surface with a radius in the range 30 to 100 mm, while the corresponding sealing surfaces may be a tapered surface wherein the tangent to the peak half angle is in the range 0.025 to 0.1, i.e. a taper in the range 5% to 20%.

At least one of the continuous threaded zones may have a variable width thread profile, formed as a dovetail and with no self-locking.

The continuous threaded zone with a variable width thread profile formed as a dovetail and without self-locking may have a radial gap between the thread crests and roots in the range 0.05 to 0.5 mm.

The continuous threaded zone with a variable width thread profile formed as a dovetail and without self-locking may have a radial gap between the thread crests and roots in the range 0.1 to 0.3 mm.

The continuous threaded zone with a variable width thread profile formed as a dovetail and without self-locking may have a radial gap between the stabbing flanks in the range 0.002 to 1 mm.

The continuous threaded zone with a variable width thread profile formed as a dovetail and without self-locking may have a radial gap between the stabbing flanks in the range 0.002 to 0.2 mm.

The continuous threaded zone with a variable width thread profile formed as a dovetail and without self-locking may have negative stabbing flank angles in the range 1 to 15 degrees.

The continuous threaded zone with a variable width thread profile formed as a dovetail and without self-locking may have negative stabbing flank angles in the range 5 to 8 degrees.

The continuous threaded zone with a variable width thread profile formed as a dovetail and without self-locking may have negative load flank angles in the range 1 to 15 degrees.

The continuous threaded zone with a variable width thread profile formed as a dovetail and without self-locking may have negative load flank angles in the range 5 to 8 degrees.

The continuous threaded zone with a variable width thread profile formed as a dovetail and without self-locking may have a pitch in the range 5 to 20 mm, wherein the pitch is identical for all of the threaded zones.

The first, second and third continuous threaded zones of each end may extend along the same taper generatrix with an inclination in the range 5% to 25%. This corresponds to a tangent to the peak half angle in the range 0.025 to 0.125.

The first, second and third continuous threaded zones of each end may extend along the same taper generatrix with an inclination in the range 10% to 18%. This corresponds to a tangent to the peak half angle in the range 0.05 to 0.09.

At least one of the continuous threaded zones may have a tapered or buttress type thread profile in accordance with API standard 5CT or has a negative load flank angle.

Each of the tubular components may comprise at least one fourth continuous threaded zone produced on another, multi-start type helix.

The invention also concerns a threaded connection resulting from self-locking connection of an assembly in accordance with the invention.

BRIEF DESCRIPTION OF THE DRAWINGS

The features and advantages of the invention are disclosed in more detail in the description below, made with reference to the accompanying drawings.

DETAILED DESCRIPTION

Figure 1:
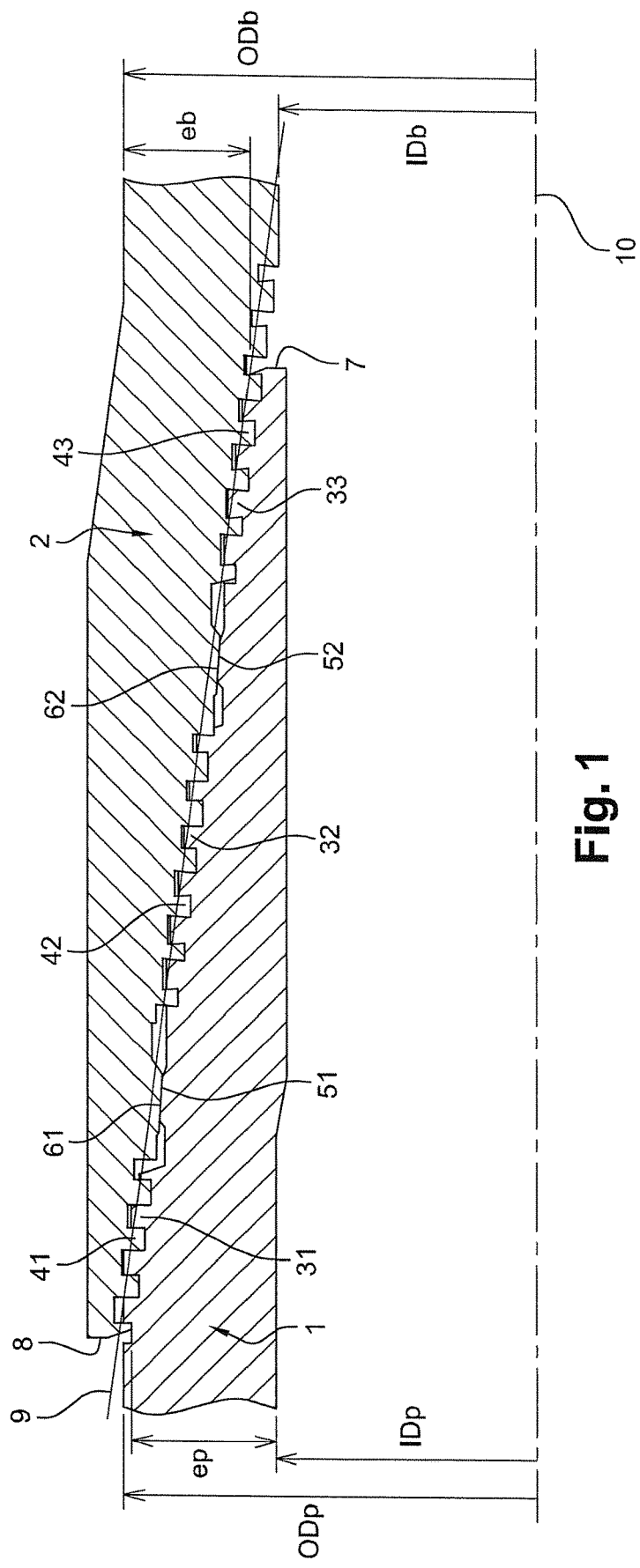
FIG. 1 is a diagrammatic view in longitudinal section of a connection resulting from connecting two tubular components by makeup, and is in accordance with one embodiment of the invention.

FIG. 1 shows an assembly for producing a threaded connection, comprising a first and a second tubular component with an axis of revolution 10. One of the components is provided with an end known as the male end 1 comprising a first 31, a second 32 and a third 33 continuous threaded zone and produced on the outer peripheral surface of the component and following the same helix. The term "following the same helix" means the fact that the first, second and third threaded zones are located in succession on the same helix and that they are synchronous to allow makeup.

The other component is provided with an end known as the female end 2, comprising a first 41, a second 42 and a third 43 continuous threaded zone and produced on the inner peripheral surface of the component and following the same helix. The term "following the same helix" means the fact that the first, second and third threaded zones are located in succession on the same helix and that they are synchronous to allow makeup.

The first 31, 41, second 32, 42 and third 33, 43 continuous threaded zones are respectively capable of mutual cooperation in order to allow makeup.

The ends 1 and 2 respectively terminate in a free terminal surface 7 and 8. The term "free" means the fact that each of the terminal surfaces is free of an abutment surface, which means that when the connection is in the made up state, the terminal surfaces are not compressed one against the other.

The assembly for producing a threaded connection of the invention does not comprise a specific abutment surface. The term "specific abutment surface" means any surface which acts solely as an abutment, i.e. its only role is to be compressed against a corresponding surface when the connection is in the made up state. In known manner, these abutment surfaces are generally surfaces which are orientated in a manner substantially perpendicular to the axis of the connection. They may also be found between two staggered threadings. The specific abutment surfaces do not belong to the threading.

On the male end 1, a first sealing surface 51 is provided between the adjacent threaded zones 31 and 32. It is capable of cooperating as an interference fit with a first sealing surface 61 provided between the adjacent threaded zones 41 and 42 on the corresponding female end when the connection is in the made up state.

On the male end 1, a second sealing surface 52 is provided between the adjacent threaded zones 33 and 32. It is capable of cooperating as an interference fit with a second sealing surface 62 provided between the adjacent threaded zones 43 and 42 on the corresponding female end when the connection is in the made up state.

Concerning the threadings, the term "continuous threaded zones" means portions of the circumferential surface of a tubular component having a continuous threading, i.e. without interruption to the helix of the threading.

In accordance with the invention, at least one of the first or second or third threaded zones has a variable width thread profile which is self-locking. The profile may be formed as a dovetail so that advantageously, it can prevent the threads from disengaging when the made up connection is under load.

Figure 2A:
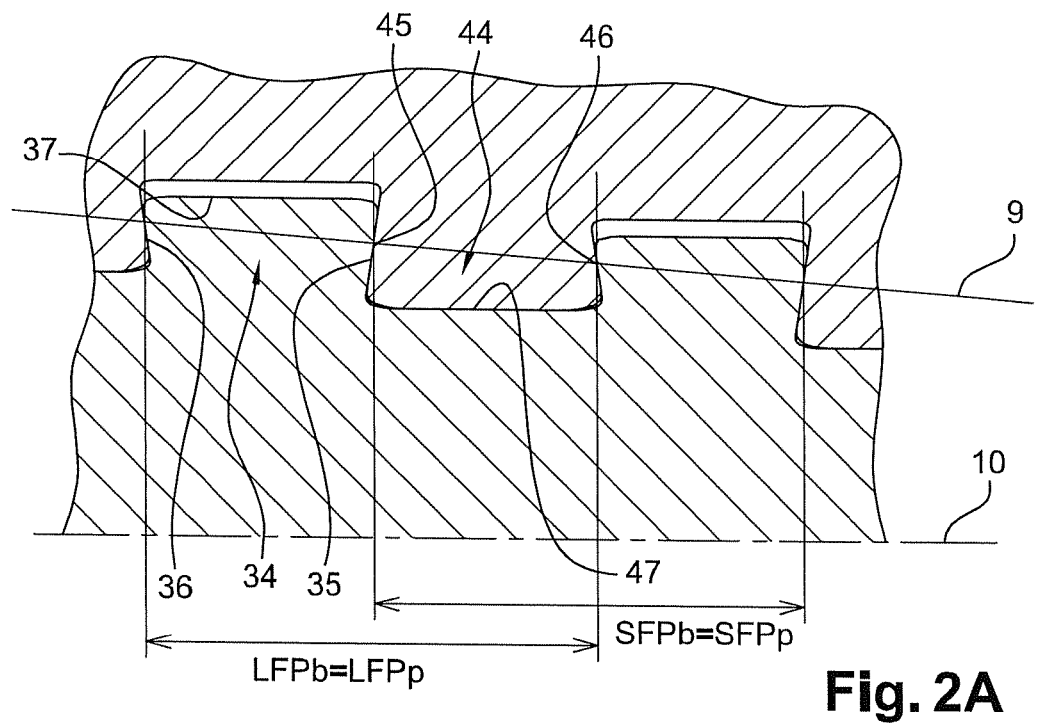
FIGS. 2A and 2B are each a diagrammatic view in longitudinal section of a detail of a threaded zone of a connection resulting from connecting two tubular components by makeup, and in accordance with one embodiment of the invention.

The term "radial interference fit threadings" means the threaded zones comprising the characteristics detailed in FIG. 2A. The male thread flanks (or teeth) 34, like the female thread flanks (or teeth) 44, have a constant pitch, while the width of the threads decreases in the direction of the respective terminal surfaces, such that during makeup, the male and female threads (or teeth) finish by becoming locked one in the other in a predetermined position. More precisely, the pitch LFPb between the load flanks 46 of the female threaded zone is constant, as is the pitch SFPb between the stabbing flanks 45 of the female threaded zone, with the particular feature that the pitch between the load flanks is greater than the pitch between the stabbing flanks. Similarly, the pitch SFPp between the male stabbing flanks 35 is constant, as is the pitch LFPp between the male load flanks 36. In addition, the respective pitches SFPp and SFPb of the male 35 and female stabbing flanks 45 are equal and less than the respective pitches LFPp and LFPb of the male 36 and female 46 load flanks, which in turn are mutually equal.

FIG. 1 also shows the thickness of the male end 1, ep, also termed the critical section of the male end 1, defined not by the difference between the outer diameter ODp and the inner diameter IDp of said end, but at the base of the threaded zone 31, i.e. at the last thread. Similarly, the thickness of the female end 2, eb, also termed the critical section of the female end 1, is not defined by the difference between the outer diameter ODb and the inner diameter IDb of said end, but at the base of the threaded zone 43, i.e. at the last thread.

Thus, the thickness of the male end 1, ep, is defined from the critical section of the male end and the thickness of the female end 2, eb, is defined from the critical section of the female end, said critical sections in fact being the surfaces made by a cross section of the male or female ends at the zones with thickness ep and eb.

Thus, the efficiency of the connection is defined as being equal to the ratio between the minimum value between the critical section of the male end and the critical section of the female end and the regular section of the tube. Naturally, the regular section of the tube has to be taken from the thickness of the threaded components measured at a distance from the threaded zones. This thickness is thus constant for the male component and for the female component. This thickness can equally be calculated from the difference between ODb and IDb, as from the difference between ODp and IDp. The notion of efficiency of the connection is linked to the fatigue strength of the connection.

Advantageously, the first, second and third continuous threaded zones of each end can extend in the same taper generatrix 9. The fact of aligning the threaded zones facilitates the machining step. Another variation would consist in staggering the threaded zones in taper generatrixes which are mutually parallel.

Advantageously, the at least one sealing surface provided between each of the adjacent threaded zones mutually cooperating to seal in an interference fit can form a torus-on-cone contact. This type of contact, known as a "point" contact, is in fact more stable.

Advantageously, the toroid surface is a domed toroid convex surface the radius R of which is preferably in the range 30 to 100 mm. Too large a radius, i.e. more than 100 mm, for the toroid surface induces identical disadvantages to those of a cone-on-cone contact. Too small a radius, i.e. less than 30 mm, induces an insufficient contact width.

Facing the toroid sealing surface, the tapered sealing surface is supported by a taper generatrix forming an angle with the axis 10 of the connection the tangent to the peak half angle of which is in the range 0.025 to 0.1, which corresponds to a taper in the range 5% to 20%.

Figure 2B:
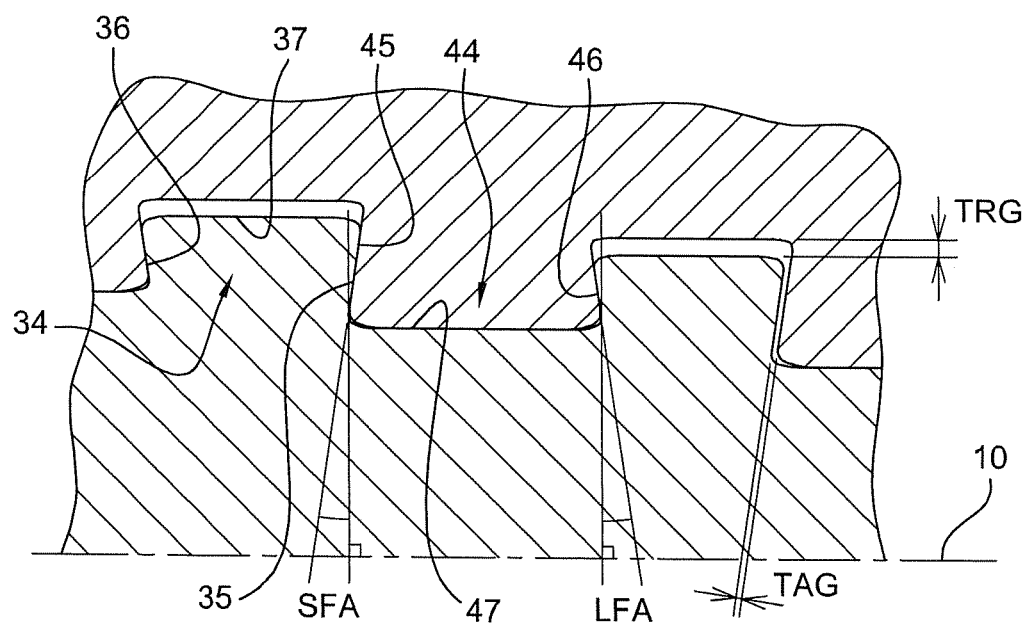

Advantageously and as can be seen in FIG. 2B, at least one of the continuous threaded zones may have a variable width thread profile formed as a dovetail and without self-locking.

In this configuration and as can be seen in FIG. 2B, the continuous threaded zone with a variable width thread profile formed as a dovetail and without self-locking may have a radial gap TRG between the thread crests and roots in the range 0.05 to 0.5 mm. In this manner, the gap is provided between the male thread crests 37 and the female thread roots 47. For this reason, free volumes are provided that can collect grease during makeup and avoid zones of excess pressure.

Preferably, the radial gap TRG between the thread crests and roots is in the range 0.1 to 0.3 mm. This value means that there is sufficient free volume to store the grease without affecting the connection efficiency.

In this configuration and as can be seen in FIG. 2B, the continuous threaded zone with a variable width thread profile formed as a dovetail and without self-locking may have an axial gap TAG between the stabbing flanks in the range 0.002 to 1 mm. In this case, the gap TAG is provided between the male stabbing flanks 35 and the female stabbing flanks 45. In this manner, free volumes are provided that can collect grease during makeup and avoid zones of excess pressure.

Preferably, the radial gap TAG between the stabbing flanks is in the range 0.002 to 0.2 mm. This value means that axial displacements during alternating loading can be minimized.

In this configuration and as can be seen in FIG. 2B, the continuous threaded zone with a variable width thread profile formed as a dovetail and without self-locking may exhibit negative stabbing flank angles SFA in the range 1 to 15 degrees. This configuration means that the threads can be locked radially.

Preferably, the negative stabbing flank angles SFA are in the range 5 to 8 degrees. These mean that the number of machining passes is acceptable.

Similarly, the continuous threaded zone with a variable width thread profile formed as a dovetail and without self-locking may have negative load flank angles LFA in the range 1 to 15 degrees.

Similarly, the negative load flank angles LFA are preferably in the range 5 to 8 degrees.

In this configuration, the continuous threaded zone with a variable width thread profile formed as a dovetail and without self-locking may have a pitch in the range 5 to 20 mm. The pitch is thus identical for all of the threaded zones.

In this configuration, for ease of makeup the first, second and third continuous threaded zones of each end may extend along the same taper generatrix 9 with an inclination in the range 5% to 25%.

Preferably, the taper generatrix 9 has an inclination in the range 10% to 18%.

In another variation, which is not shown in detail in the figures, at least one of the continuous threaded zones may have a tapered or buttress type thread profile in accordance with API standard 5CT or have a negative load flank angle.

In another variation, not shown in detail on the figures, each of the tubular components may comprise at least one fourth continuous threaded zone which can cooperate with the corresponding threaded zone during makeup. This configuration, which uses threadings known as "multi-start" threadings, can be used to minimize galling risks.

Figure 3A:
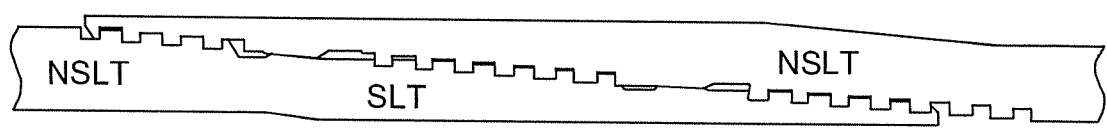
FIGS. 3A to 3N are diagrammatic views in longitudinal section of a connection resulting from connecting two tubular components by makeup, in accordance with various embodiments.
Figure 3B:
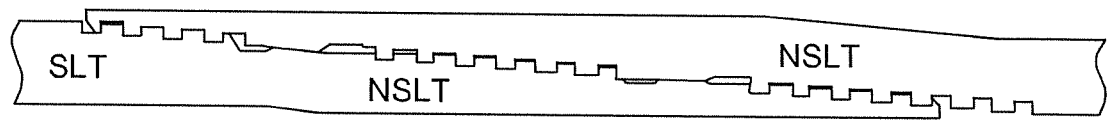
Figure 3C:
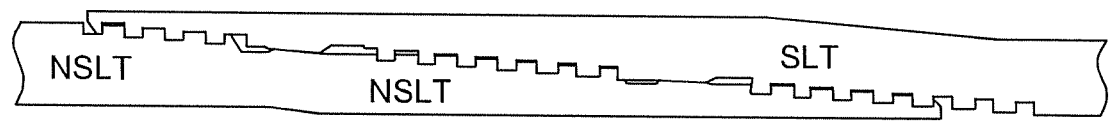
Figure 3D:
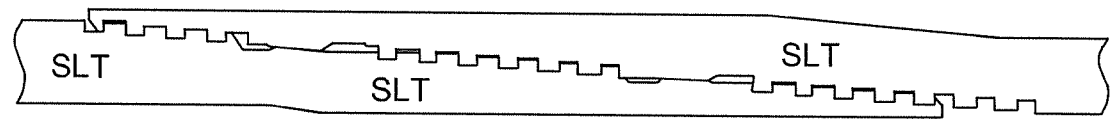
Figure 3E:
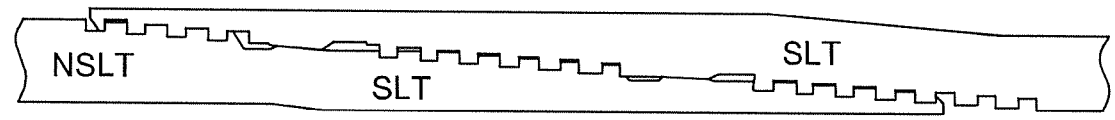
Figure 3F:
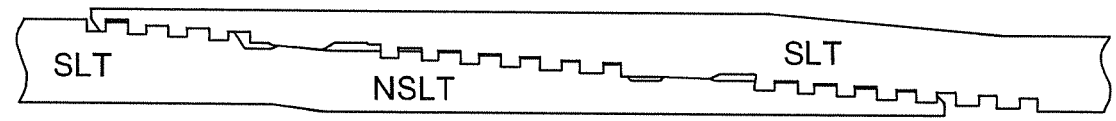
Figure 3G:
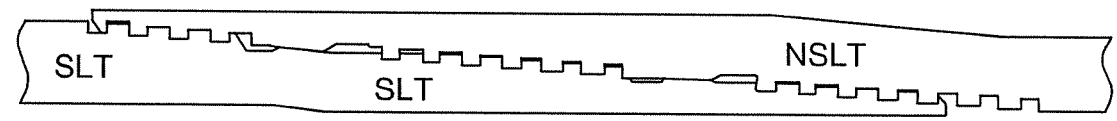
Figure 3H:
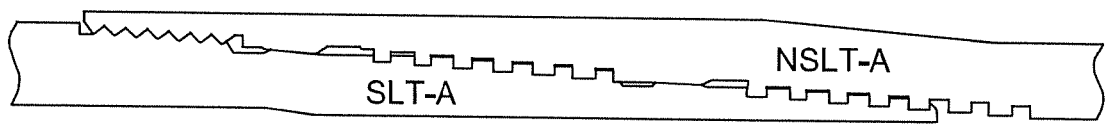
Figure 3I:
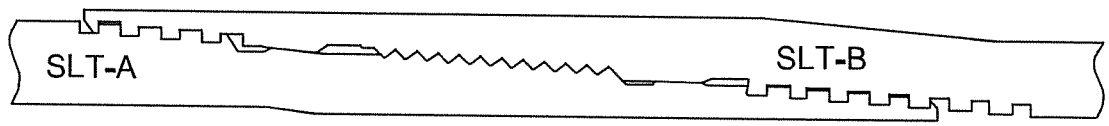
Figure 3J:
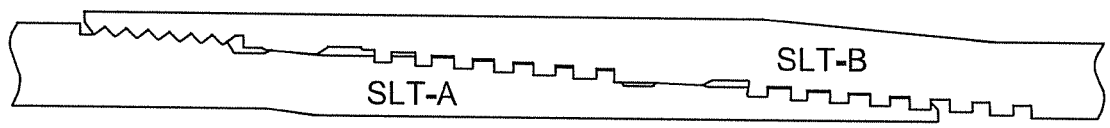
Figure 3K:
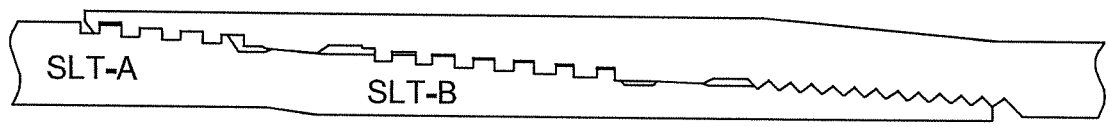
Figure 3L:
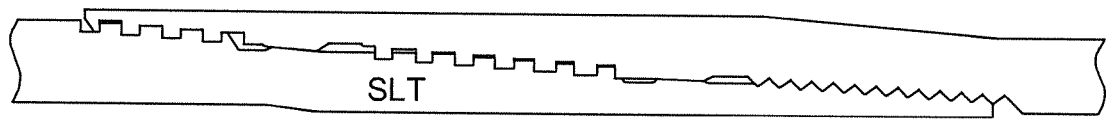
Figure 3M:
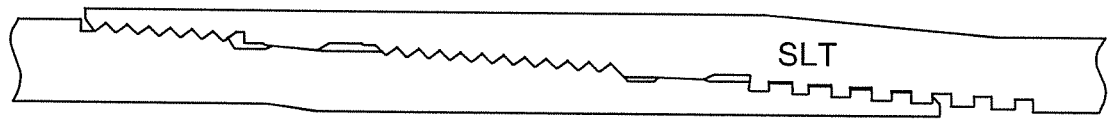
Figure 3N:
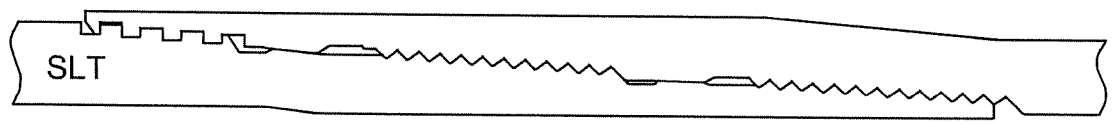

FIGS. 3A to 3N recapitulate the various possible configurations which might be employed.

FIG. 3A comprises, from left to right, a first continuous threaded zone NSLT with a variable width thread profile formed as a dovetail and without self-locking, a second continuous threaded zone SLT with a variable width thread profile formed as a dovetail and with self-locking, and a third continuous threaded zone NSLT with a variable width thread profile formed as a dovetail and without self-locking.

FIG. 3B comprises, from left to right, a first continuous threaded zone SLT with a variable width thread profile formed as a dovetail and with self-locking, a second continuous threaded zone NSLT with a variable width thread profile formed as a dovetail and without self-locking, and a third continuous threaded zone NSLT with a variable width thread profile formed as a dovetail and without self-locking.

FIG. 3C comprises, from left to right, a first continuous threaded zone NSLT with a variable width thread profile formed as a dovetail and without self-locking, a second continuous threaded zone NSLT with a variable width thread profile formed as a dovetail and without self-locking, and a third continuous threaded zone SLT with a variable width thread profile formed as a dovetail and with self-locking.

FIG. 3D comprises, from left to right, a first continuous threaded zone SLT with a variable width thread profile formed as a dovetail and with self-locking, a second continuous threaded zone SLT with a variable width thread profile formed as a dovetail and with self-locking, and a third continuous threaded zone SLT with a variable width thread profile formed as a dovetail and with self-locking.

FIG. 3E comprises, from left to right, a first continuous threaded zone NSLT with a variable width thread profile formed as a dovetail and without self-locking, a second continuous threaded zone SLT with a variable width thread profile formed as a dovetail and with self-locking, and a third continuous threaded zone SLT with a variable width thread profile formed as a dovetail and with self-locking.

FIG. 3F comprises, from left to right, a first continuous threaded zone SLT with a variable width thread profile formed as a dovetail and with self-locking, a second continuous threaded zone NSLT with a variable width thread profile formed as a dovetail and without self-locking, and a third continuous threaded zone SLT with a variable width thread profile formed as a dovetail and with self-locking.

FIG. 3G comprises, from left to right, a first continuous threaded zone SLT with a variable width thread profile formed as a dovetail and with self-locking, a second continuous threaded zone SLT with a variable width thread profile formed as a dovetail and with self-locking, and a third continuous threaded zone NSLT with a variable width thread profile formed as a dovetail and without self-locking.

FIG. 3H comprises, from left to right, a first continuous threaded zone with a tapered or buttress thread profile or a thread profile with a negative load flank angle, a second continuous threaded zone SLT-A with a variable width thread profile formed as a dovetail and with self-locking, and a third continuous threaded zone NSLT-A with a variable width thread profile formed as a dovetail and without self-locking.

FIG. 3I comprises, from left to right, a first continuous threaded zone SLT-A with a variable width thread profile formed as a dovetail and with self-locking, a second continuous threaded zone with a tapered or buttress thread profile or a thread profile with a negative load flank angle, and a third continuous threaded zone SLT-B with a variable width thread profile formed as a dovetail and with self-locking.

FIG. 3J comprises, from left to right, a first continuous threaded zone with a tapered or buttress thread profile or a thread profile with a negative load flank angle, a second continuous threaded zone SLT-A with a variable width thread profile formed as a dovetail and with self-locking, and a third continuous threaded zone SLT-B with a variable width thread profile formed as a dovetail and with self-locking.

FIG. 3K comprises, from left to right, a first continuous threaded zone SLT-A with a variable width thread profile formed as a dovetail and with self-locking, a second continuous threaded zone SLT-B with a variable width thread profile formed as a dovetail and with self-locking, and a third continuous threaded zone with a tapered or buttress thread profile or a thread profile with a negative load flank angle.

FIG. 3L comprises, from left to right, a first continuous threaded zone with a tapered or buttress thread profile or a thread profile with a negative load flank angle, a second continuous threaded zone SLT with a variable width thread profile formed as a dovetail and with self-locking, and a third continuous threaded zone with a tapered or buttress thread profile or a thread profile with a negative load flank angle.

FIG. 3M comprises, from left to right, a first continuous threaded zone with a tapered or buttress thread profile or a thread profile with a negative load flank angle, a second continuous threaded zone with a tapered or buttress thread profile or a thread profile with a negative load flank angle, and a third continuous threaded zone SLT with a variable width thread profile formed as a dovetail and with self-locking.

FIG. 3N comprises, from left to right, a first continuous threaded zone SLT with a variable width thread profile formed as a dovetail and with self-locking, a second continuous threaded zone with a tapered or buttress thread profile or a thread profile with a negative load flank angle, and a third continuous threaded zone with a tapered or buttress thread profile or a thread profile with a negative load flank angle.

Comparative simulations were carried out on VAM SLIJ-II connections and on connections in accordance with the invention. VAM SLIJ-II connections are integral type connections comprising two staggered threaded zones separated by an intermediate abutment and two sealing surfaces, one inner and the other outer.

Figure 4A:
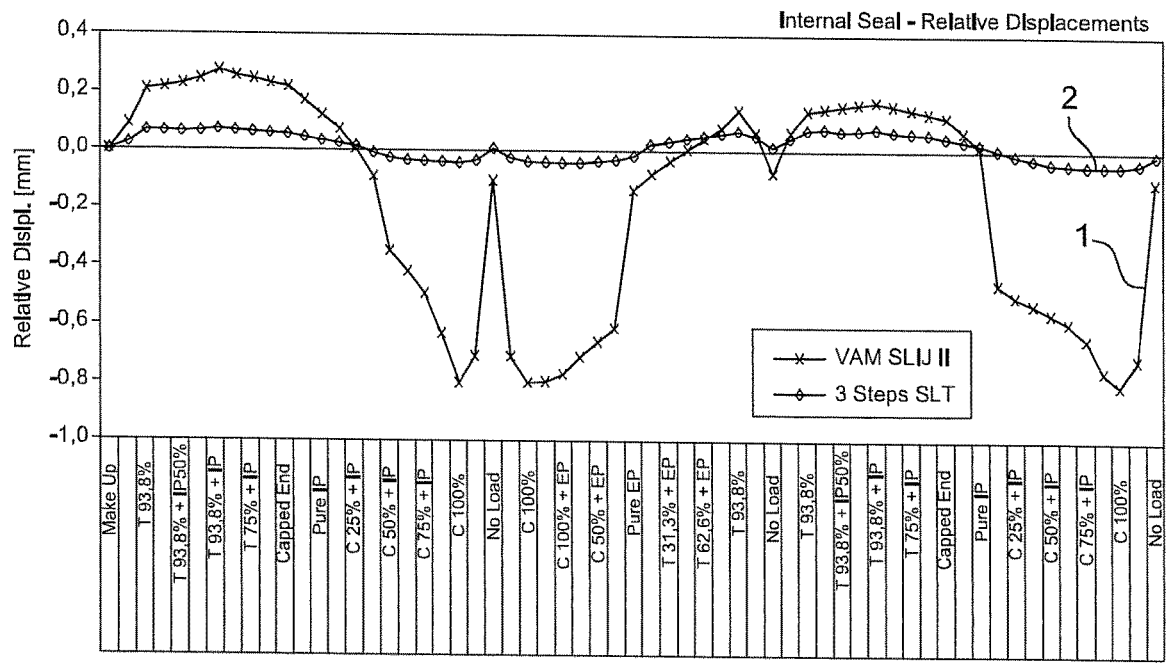
FIGS. 4A and 4B show the relative displacements of inner and outer sealing surfaces.

The graph in FIG. 4A shows, in curve 1, the relative displacement of the inner sealing surfaces in contact for a carbon steel VAM SLIJ-II connection with an outer diameter of 9⅞" (i.e. 250.83 mm), a nominal weight of 62.8 (i.e. a thickness of 15.88 mm) and with a P110 yield strength, i.e. 758 MPa.

Curve 2 of the graph in FIG. 4A shows the relative displacement of the inner sealing surfaces in contact for a carbon steel connection of the invention with an outer diameter of 9⅞" (i.e. 250.83 mm), a nominal weight of 62.8 (i.e. a thickness of 15.88 mm) and with a P110 yield strength, i.e. 758 MPa.

It can clearly be seen that curve 2 keeps close to the horizontal axis. This means that the connection of the invention is less sensitive to applied loads, irrespective of variations in internal pressure (IP) or external pressure (EP), tensile stresses (T), compressive loads (C), or several of these in combination.

In contrast, curve 1 comprises portions which deviate substantially from the horizontal axis. This means that the VAM SLIJ-II connection is more sensitive to the loads described above.

Figure 4B:
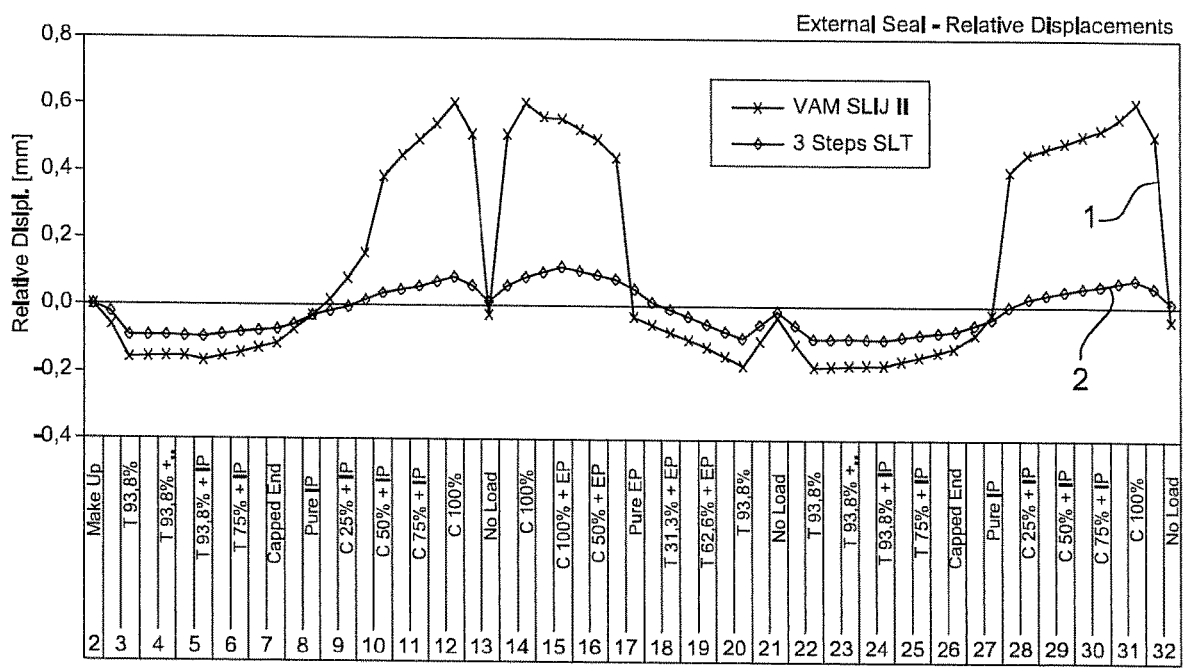

In the graph of FIG. 4B, comparative results are shown between the relative displacement of the external sealing surfaces in contact of the VAM SLIJ-II connection of FIG. 4A and the relative displacement of the sealing surfaces in contact of the connection of the invention, also in FIG. 4A. The conclusions are identical to those of FIG. 4A.

This type of threading is associated with a gain in efficiency since at the effective sections of the male and female end seals, there are no sealing surfaces, simply vanishing threads. In addition, as was shown above, the sealing surfaces are located between two continuous thread zones, thereby providing greater stability of the contacts during alternating compressive and tensile loads and also increasing their contact pressures due to the greater thickness of material below the surfaces, thus improving the sealing performances under high internal and external pressures. Similarly, the positioning of these sealing surfaces is carried out with the aid of at least one self-locking threading, which avoids using an abutment and thus optimizes the thread surfaces and the length of the connection, meaning that makeup is better.

The invention claimed is:

1. An assembly for producing a threaded connection, comprising:
a first and a second tubular component with an axis of revolution and each respectively provided with a threaded end including at least a first continuous threaded zone, a second continuous threaded zone, and a third continuous threaded zone aligned with a same helix on an outer or inner peripheral surface of the component depending on whether the threaded end is male or female in type, and configured to cooperate together upon makeup, at least one of the first or second or third threaded zones having a variable width thread profile that is self-locking, said threaded end of the first tubular component and the threaded end of the second tubular component each finishing in a free terminal surface and being free of a specific abutment surface, at least one sealing surface being provided between each of the adjacent threaded zones of the first tubular component and the second tubular component such that the at least one sealing surface provided between the first threaded zone and the second threaded zone of the first and second tubular component cooperate in a sealed interference fit and the at least one sealing surface provided between the second threaded zone and the third threaded zone of the first and second tubular component cooperate in a sealed interference fit when the connection is in a made up state,
wherein the first, second, and third continuous threaded zones of each threaded end extend in a same taper generatrix.

2. The assembly for producing a threaded connection according to claim 1, wherein the at least one sealing surface provided between each of the adjacent threaded zones and cooperating mutually in an interference fit form a torus-on-cone contact.

3. The assembly for producing a threaded connection according to claim 2, wherein one of the sealing surfaces is a domed surface with a radius in a range of 30 to 100 mm, while the corresponding sealing surface is a tapered surface wherein a tangent to a peak half angle is in a range 0.025 to 0.1.

4. The assembly for producing a threaded connection according to claim 1, wherein at least one of the continuous threaded zones has a variable width thread profile, formed as a dovetail and with no self-locking.

5. The assembly for producing a threaded connection according to claim 4, wherein the continuous threaded zone with a variable width thread profile formed as a dovetail and without self-locking has a radial gap (TRG) between thread crests and roots in a range of 0.05 to 0.5 mm.

6. The assembly for producing a threaded connection according to claim 4, wherein the continuous threaded zone with a variable width thread profile formed as a dovetail and without self-locking has a radial gap (TRG) between thread crests and roots in a range of 0.1 to 0.3 mm.

7. The assembly for producing a threaded connection according to claim 4, wherein the continuous threaded zone with a variable width thread profile formed as a dovetail and without self-locking has an axial gap (TAG) between stabbing flanks in a range of 0.002 to 1 mm.

8. The assembly for producing a threaded connection according to claim 4, wherein the continuous threaded zone with a variable width thread profile formed as a dovetail and without self-locking has an axial gap (TAG) between stabbing flanks in a range of 0.002 to 0.2 mm.

9. The assembly for producing a threaded connection according to claim 4, wherein the continuous threaded zone with a variable width thread profile formed as a dovetail and without self-locking has negative stabbing flank angles (SFA) in a range of 1 to 15 degrees.

10. The assembly for producing a threaded connection according to claim 4, wherein the continuous threaded zone with a variable width thread profile formed as a dovetail and without self-locking has negative stabbing flank angles (SFA) in a range of 5 to 8 degrees.

11. The assembly for producing a threaded connection according to claim 4, wherein the continuous threaded zone with a variable width thread profile formed as a dovetail and without self-locking has negative load flank angles (LFA) in a range of 1 to 15 degrees.

12. The assembly for producing a threaded connection according to claim 4, wherein the continuous threaded zone with a variable width thread profile formed as a dovetail and without self-locking has negative load flank angles (LFA) in a range of 5 to 8 degrees.

13. The assembly for producing a threaded connection according to claim 4, wherein the continuous threaded zone with a variable width thread profile formed as a dovetail and without self-locking has a pitch in a range of 5 to 20 mm, and wherein the pitch is identical for all of the threaded zones.

14. The assembly for producing a threaded connection according to claim 4, wherein the first, second, and third continuous threaded zones of each threaded end extend along the same taper generatrix with an inclination in a range of 5% to 25%.

15. The assembly for producing a threaded connection according to claim 4, wherein the first, second, and third continuous threaded zones of each threaded end extend along the same taper generatrix with an inclination in a range of 10% to 18%.

16. The assembly for producing a threaded connection according to claim 1, wherein at least one of the continuous threaded zones has a tapered or buttress type thread profile or has a negative load flank angle.

17. The assembly for producing a threaded connection according to claim 1, wherein each of the tubular components comprises at least one fourth continuous threaded zone produced on another, multi-start type helix.

18. A threaded connection comprising:
the assembly for producing a threaded connection according to claim 1.

19. The assembly for producing a threaded connection according to claim 1, wherein each of the free terminal surfaces is located within one of the continuous threaded zones in the made up state.

20. The assembly for producing a threaded connection according to claim 1, wherein each of the threaded zones and each of the sealing surface is separated by a gap in the made up state.

21. An assembly for producing a threaded connection, comprising:
- a first and a second tubular component with an axis of revolution and each respectively provided with a threaded end including at least a first continuous threaded zone, a second continuous threaded zone, and a third continuous threaded zone aligned with a same taper generatix on an outer or inner peripheral surface of the component depending on whether the threaded end is male or female in type, and configured to cooperate together upon makeup, at least one of the first or second or third threaded zones of the first tubular component having a variable width thread profile that is self-locking and corresponding at least one of the first or second or third threaded zones of the second tubular component having also a variable width thread profile that is self-locking in order to cooperate together upon makeup, said threaded end of the first and second tubular component finishing in a free terminal surface and being free of a specific abutment surface, at least one sealing surface being provided between each of the adjacent threaded zones of the first tubular component and the second tubular component such that the at least one sealing surface provided between the first threaded zone and the second threaded zone of the first and second tubular component cooperate in a sealed interference fit and the at least one sealing surface provided between the second threaded zone and the third threaded zone of the first and second tubular component cooperate in a sealed interference fit when the connection is in a made up state,
- wherein the at least one sealing surface provided between each of the adjacent threaded zones and cooperating mutually in an interference fit form a torus-on-cone contact, and
- wherein at least one of the first or second or third threaded zones of the first and the second tubular component are not self-locking.

* * * * *